US012379933B2

(12) United States Patent
Rakshit et al.

(10) Patent No.: US 12,379,933 B2
(45) Date of Patent: Aug. 5, 2025

(54) ULTRA PIPELINED ACCELERATOR FOR MACHINE LEARNING INFERENCE

(71) Applicant: Samsung Electronics Co., Ltd., Suwon-si (KR)

(72) Inventors: Titash Rakshit, Austin, TX (US); Malik Aqeel Anwar, Atlanta, GA (US); Ryan Hatcher, Austin, TX (US)

(73) Assignee: Samsung Electronics Co., Ltd., Yongin-si (KR)

( * ) Notice: Subject to any disclaimer, the term of this patent is extended or adjusted under 35 U.S.C. 154(b) by 1257 days.

(21) Appl. No.: 16/838,971

(22) Filed: Apr. 2, 2020

(65) Prior Publication Data

US 2021/0124588 A1 Apr. 29, 2021

Related U.S. Application Data

(60) Provisional application No. 62/934,355, filed on Nov. 12, 2019, provisional application No. 62/927,544, filed on Oct. 29, 2019, provisional application No. 62/926,292, filed on Oct. 25, 2019.

(51) Int. Cl.
*G06F 9/38* (2018.01)
*G06F 17/16* (2006.01)
*G06N 3/02* (2006.01)
*G06T 1/20* (2006.01)

(52) U.S. Cl.
CPC .......... *G06F 9/3867* (2013.01); *G06F 17/16* (2013.01); *G06N 3/02* (2013.01); *G06T 1/20* (2013.01)

(58) Field of Classification Search
CPC ...................................................... G06N 3/02
See application file for complete search history.

(56) References Cited

U.S. PATENT DOCUMENTS

| 8,941,653 | B2 | 1/2015 | Molnar et al. |
| 10,353,618 | B2 | 7/2019 | Lea et al. |
| 10,452,578 | B2 | 10/2019 | Lea |
| 10,460,773 | B2 | 10/2019 | La Fratta |
| 2016/0224465 | A1 | 8/2016 | Morad et al. |
| 2018/0260612 | A1 | 9/2018 | Richards |

(Continued)

FOREIGN PATENT DOCUMENTS

| JP | 2019-79505 A | 5/2019 |
| JP | 2019-185784 A | 10/2019 |
| WO | 2018/130029 A1 | 7/2018 |

OTHER PUBLICATIONS

Linghao Song, "PipeLayer: A Pipelined ReRAM-Based Accelerator for Deep Learning" (Year: 2017).*

(Continued)

*Primary Examiner* — Van C Mang
(74) *Attorney, Agent, or Firm* — Lewis Roca Rothgerber Christie LLP

(57) ABSTRACT

A method of pipelining inference of a neural network, which includes an i-th layer (i being an integer greater than zero), an (i+1)-th layer, and an (i+2)-th layer, includes processing a first set of i-th values of the i-th layer to generate (i+1)-th values for the (i+1)-th layer, determining a quantity of the (i+1)-th values as being sufficient for processing, and in response to the determining, processing the (i+1)-th values to generate an output value for the (i+2)-th layer while concurrently processing a second set of i-th values of the i-th layer.

19 Claims, 5 Drawing Sheets

(56) References Cited

U.S. PATENT DOCUMENTS

| | | |
|---|---|---|
| 2019/0042411 A1 | 2/2019 | Muralimanohar et al. |
| 2019/0079886 A1 | 3/2019 | Malladi et al. |
| 2019/0164046 A1 | 5/2019 | Song et al. |
| 2019/0205244 A1 | 7/2019 | Smith |
| 2019/0324856 A1 | 10/2019 | Zhao et al. |
| 2019/0340508 A1 | 11/2019 | Liu et al. |

OTHER PUBLICATIONS

Kamel Abdelouahab, "Accelerating CNN inference on FPGAs: A Survey" (Year: 2018).*
Liu, "Semantic Image Segmentation via Deep Parsing Network" (Year: 2015).*
Alwani, "Fused-Layer CNN Accelerators", IEEE (Year: 2016).*
US Notice of Allowance dated May 23, 2023, issued in U.S. Appl. No. 16/839,043 (10 pages).
Alwani, Manoj, et al., "Fused-Layer CNN Accelerators," 2016 49th Annual IEEE/ACM International Symposium on Microarchitecture (MICRO), Oct. 2016, 12 pages.
EPO Office Action dated Mar. 16, 2023, issued in corresponding European Patent Application No. 20187893.1 (7 pages).
EPO Extended Search Report dated Mar. 5, 2021, issued in corresponding European Patent Application No. 20187893.1 (8 pages).
Abdelouahab, K., et al. "Accelerating CNN inference on FPGAs: A Survey", arXiv preprint arXiv:1806.01683v1, May 26, 2018, 30 pages.
Office Action for U.S. Appl. No. 16/839,043 dated Mar. 17, 2022, 26 pages.
Song, L., et al. "PipeLayer: A Pipelined ReRAM-Based Accelerator for Deep Learning", 2017 IEEE International Symposium on High Performance Computer Architecture (HPCA), pp. 541-552, 2017.
Abdelouahab, Kamel, et al., "Accelerating CNN inference on FPGAs: A Survey," Jan. 2018, XP055717619, 31 pages, Retrieved from the Internet: URL:https://hal.archives-ouvertes.fr/hal-01695375v1/document [retrieved on Jul. 23, 2020].
Shafiee, Ali, et al., "Isaac: A Convolutional Neural Network Accelerator with In-Situ Analog Arithmetic in Crossbars," 2016 ACM/IEEE 43rd Annual International Symposium on Computer Architecture, Jun. 2016, pp. 14-26.
EPO Extended Search Report dated Apr. 7, 2021, issued in European Patent Application No. 20193354.6 (11 pages).
Liu, J., et al. Processing-in-Memory for Energy-efficient Neural Network Training: A Heterogeneous Approach, 2018 51st Annual IEEE/ACM International Symposium on Microarchitecture (MICRO), 2018, pp. 655-668.
Mittal, S., "A Survey of ReRAM-Based Architectures for Processing-In-Memory and Neural Networks," Machine Learning & Knowledge Extraction, Apr. 30, 2018, 40 pages.
Song, L., et al., "PipeLayer: A Pipelined ReRAM-Based Accelerator for Deep Learning," 10353 2017 IEEE International Symposium on High Performance Computer Architecture (HPCA), Austin, TX, 2017, pp. 541-552. doi: 10.1109/HPCA.2017.55.
Long, Y., et al. ReRam based Processing memory Architecture for Recurrent Neural Network Acceleration, IEEE, 12 pages.
Geng et al. "LP-BNN: Ultra-low-Latency BNN Interference with Layer Paralellism," IEEE $30^{th}$ Intl. Conference on Application-Specific Systems, Architectures, and Processors (ASAP), 2019, 9-16 pages.
Office Action for U.S. Appl. No. 16/839,043 dated Nov. 2, 2022, 29 pages.
U.S. Final Office Action dated Jul. 29, 2022, issued in U.S. Appl. No. 16/839,043 (28 pages).
Japanese Office Action dated Sep. 24, 2024, issued in Japanese Patent Application No. 2020-178413, 7 pages.

* cited by examiner

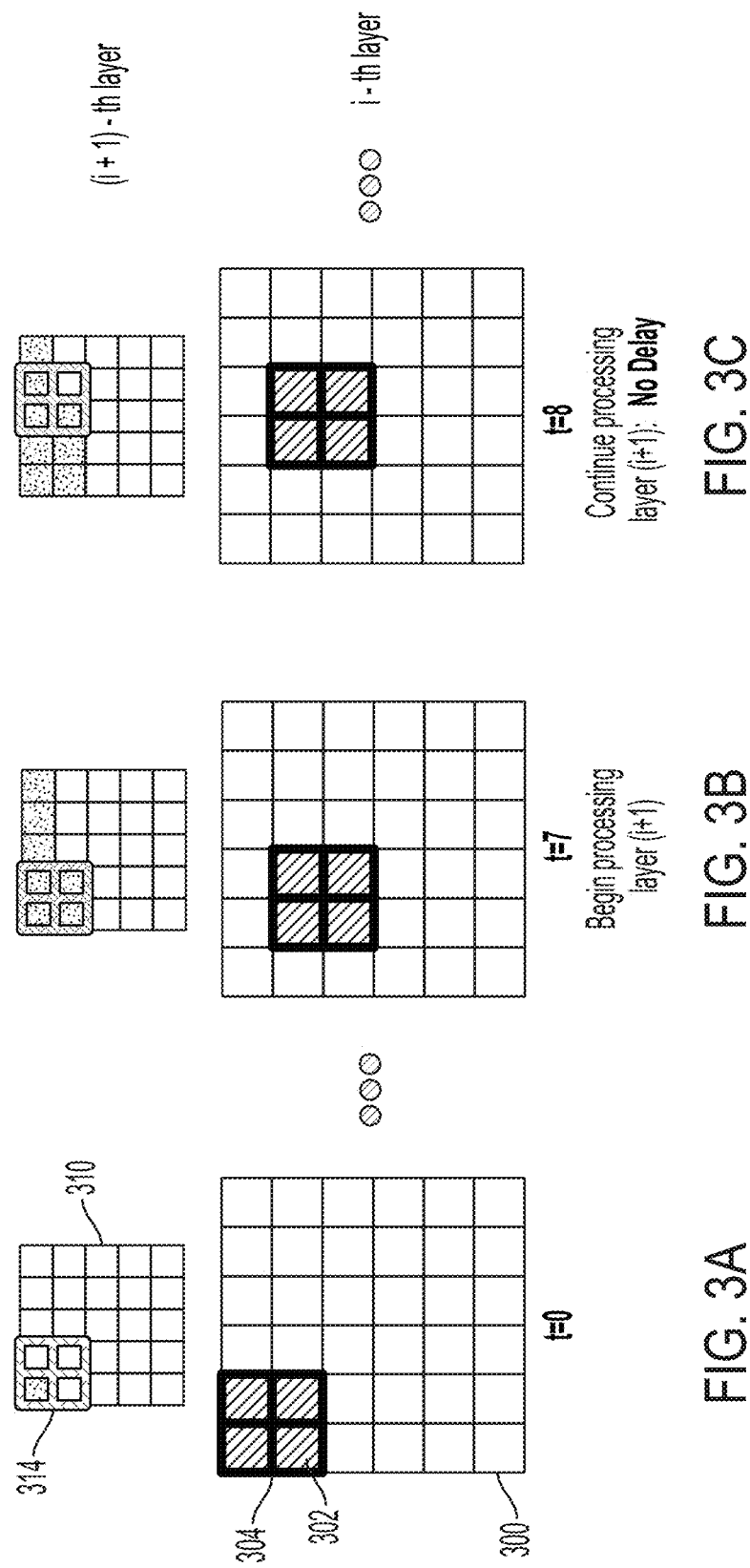

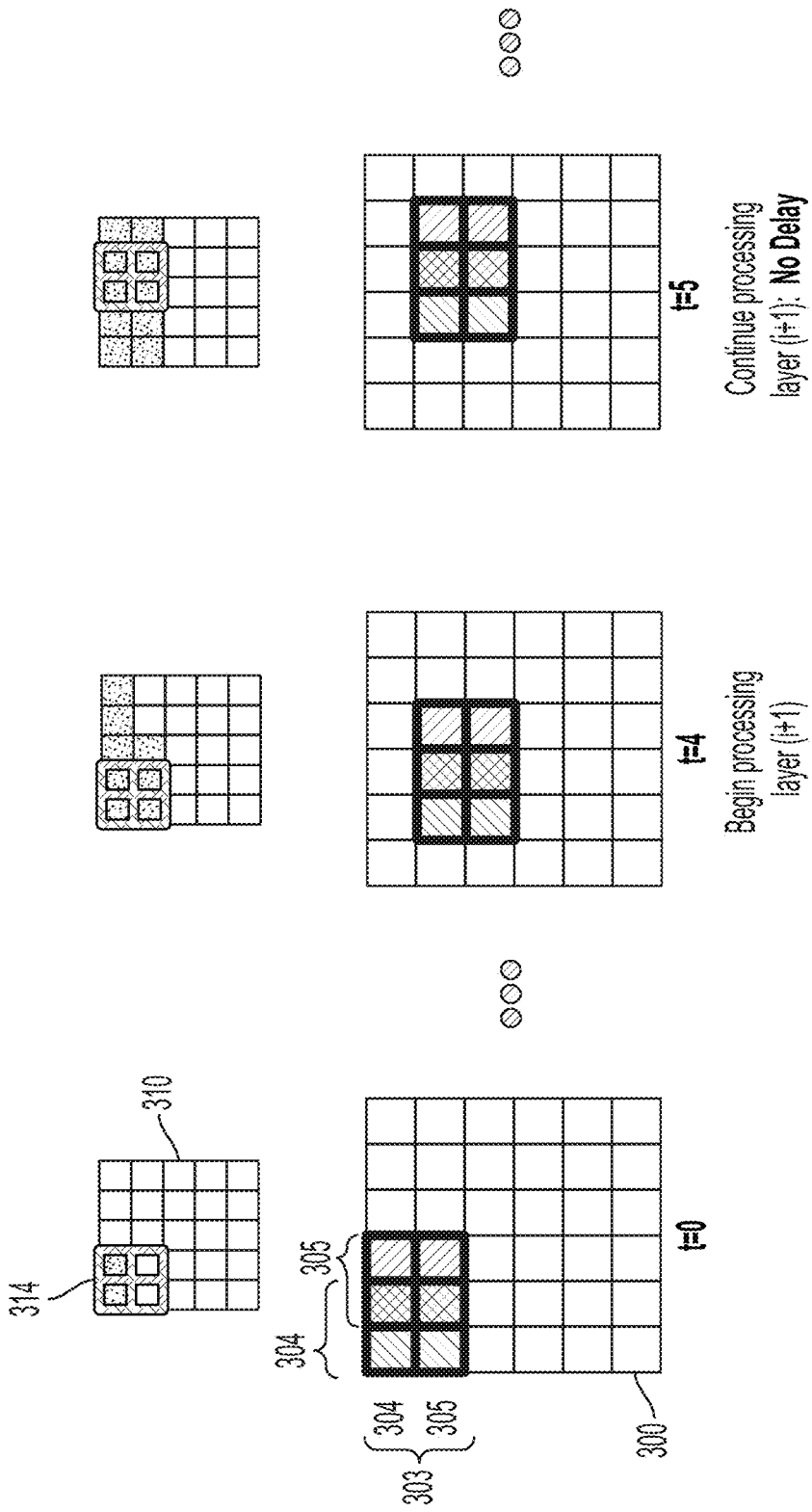

ULTRA PIPELINED ACCELERATOR FOR MACHINE LEARNING INFERENCE

CROSS-REFERENCE TO RELATED APPLICATION(S)

This application claims priority to, and the benefit of, U.S. Provisional Application No. 62/926,292 ("ULTRA PIPELINED PIM BASED ACCELERATOR FOR ML INFERENCE"), filed on Oct. 25, 2019, and U.S. Provisional Patent Application No. 62/927,544 ("BATCH SIZE PIPELINED PIM ACCELERATOR FOR VISION INFERENCE ON MULTIPLE IMAGES"), filed on Oct. 29, 2019, the entire contents of which are incorporated herein by reference; and claims priority to and the benefit of U.S. Provisional Application No. 62/934,355 ("ENABLING ULTRA-PIPELINED, NOVEL STT MRAM BASED PROCESSING-IN-MEMORY DNN ACCELERATOR"), filed Nov. 12, 2019.

The present application is also related to U.S. patent application Ser. No. 16/839,043 entitled ("BATCH SIZE PIPELINED PIM ACCELERATOR FOR VISION INFERENCE ON MULTIPLE IMAGES"), filed on Apr. 2, 2020, which claims priority to and the benefit of U.S. Provisional Application No. 62/926,292 ("ULTRA PIPELINED PIM BASED ACCELERATOR FOR ML INFERENCE"), filed on Oct. 25, 2019, and U.S. Provisional Patent Application No. 62/927,544 ("BATCH SIZE PIPELINED PIM ACCELERATOR FOR VISION INFERENCE ON MULTIPLE IMAGES"), filed on Oct. 29, 2019, the entire contents of which are hereby expressly incorporated by reference. U.S. patent application Ser. No. 16/839,043 also claims priority to and the benefit of U.S. Provisional Application No. 62/934,355 ("ENABLING ULTRA-PIPELINED, NOVEL STT MRAM BASED PROCESSING-IN-MEMORY DNN ACCELERATOR"), filed Nov. 12, 2019.

FIELD

Aspects of embodiments of the present disclosure are generally related to machine learning.

BACKGROUND

An explosion in big data driven machine learning (ML) applications in conjunction with the prospect of a slowdown of Moore's Law are prompting the search for alternative application-specific hardware fabrics. With its focus on bringing the compute inside memory bitcells, processing-in-memory (PIM) has been proposed to accelerate ML inference applications. ML applications and networks need to be mapped onto the underlying hardware fabric efficiently to extract highest power-performance.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a system and method for mapping a machine learning (ML) application in a pipelined fashion onto a processing-in-memory (PIM) based accelerator. According to some embodiments, the pipelining includes inter-layer pipelining, intra-layer pipelining, and/or a combination of the two. Further, the pipelining schemes of the various embodiments, allow for generation of multiple outputs in one clock cycle for multiple images simultaneously.

Aspects of embodiments of the present disclosure are directed to a configurable hardware accelerator based on mixed-signal PIMs, where the machine learning problem is mapped onto PIM subarrays in a pipelined fashion.

Aspects of embodiments of the present disclosure are directed to a configurable hardware accelerator based on mixed-signal PIMs that receives as input multiple images for recognition. The input activations for the multiple images are received in a pipelined fashion onto the accelerator.

According to some embodiments of the present disclosure, there is provided a method of pipelining inference of a neural network including a plurality of layers including an i-th layer (i being an integer greater than zero), an (i+1)-th layer, and an (i+2)-th layer, the method including: processing a first set of i-th values of the i-th layer to generate (i+1)-th values for the (i+1)-th layer; determining a quantity of the (i+1)-th values as being sufficient for processing; and in response to the determining, processing the (i+1)-th values to generate an output value for the (i+2)-th layer while concurrently processing a second set of i-th values of the i-th layer.

In some embodiments, the first set of i-th values include pixel values of an image.

In some embodiments, the first set of i-th values include values of a feature map generated by a previous layer of the neural network.

In some embodiments, the processing of the first set of i-th values of the i-th layer includes: applying an i-th filter associated with the i-th layer to the first set of i-th values of the i-th layer to generate the (i+1)-th values for the (i+1)-th layer.

In some embodiments, the i-th filter is a sliding convolutional filter in a form of a p×q matrix, where p and q are integers greater than zero.

In some embodiments, applying the i-th filter includes: performing a matrix multiplication operation between the i-th filter and ones of the first set of i-th values overlapping the i-th filter.

In some embodiments, the determining the quantity of the (i+1)-th values as being sufficient for processing includes determining that an (i+1)-th filter associated the (i+1)-th layer has data for each unit being operated on by the (i+1)-th filter.

In some embodiments, the determining the quantity of the (i+1)-th values as being sufficient for processing is based on a clock cycle determined by at least one of a size of an i-th filter associated with the i-th layer, a size of an (i+1)-th filter associated with the (i+1)-th layer, a stride of the (i+1)-th filter, a size of an image or feature map corresponding to the first and second set of i-th values of the i-th layer.

In some embodiments, the processing of the first set of i-th values of the i-th layer includes: applying a first i-th filter associated with the i-th layer to a first part of the first set of i-th values to generate a first one of the (i+1)-th values for the (i+1)-th layer; and concurrently with applying the first i-th filter, applying a second i-th filter associated with the i-th layer to a second part of the first set of i-th values to generate a second one of the (i+1)-th values for the (i+1)-th layer.

In some embodiments, the first and second parts of the first set of i-th values have overlapping values.

In some embodiments, the first and second parts of the first set of i-th values do not have overlapping values.

In some embodiments, the first and second i-th filters are sliding convolutional filters having a same stride and a same dimension.

In some embodiments, the first and second i-th filters include the same weight values.

According to some embodiments of the present disclosure, there is provided a system for pipelining inference of a neural network including a plurality of layers including an i-th layer (i being an integer greater than zero), an (i+1)-th layer, and an (i+2)-th layer, the system including: a processor; and a processor memory local to the processor, wherein the processor memory has stored thereon instructions that, when executed by the processor, cause the processor to perform: processing a first set of i-th values of the i-th layer to generate (i+1)-th values for the (i+1)-th layer; determining a quantity of the (i+1)-th values as being sufficient for processing; and in response to the determining, processing the (i+1)-th values to generate an output value for the (i+2)-th layer while concurrently processing a second set of i-th values of the i-th layer.

In some embodiments, the processing of the first set of i-th values of the i-th layer includes: applying an i-th filter associated with the i-th layer to the first set of i-th values of the i-th layer to generate the (i+1)-th values for the (i+1)-th layer.

In some embodiments, the determining the quantity of the (i+1)-th values as being sufficient for processing is based on a clock cycle determined by at least one of a size of an i-th filter associated with the i-th layer, a size of an (i+1)-th filter associated with the (i+1)-th layer, a stride of the (i+1)-th filter, a size of an image or feature map corresponding to the first and second set of i-th values of the i-th layer.

In some embodiments, the processing of the first set of i-th values of the i-th layer includes: applying a first i-th filter associated with the i-th layer to a first part of the first set of i-th values to generate a first one of the (i+1)-th values for the (i+1)-th layer; and concurrently with applying the first i-th filter, applying a second i-th filter associated with the i-th layer to a second part of the first set of i-th values to generate a second one of the (i+1)-th values for the (i+1)-th layer.

According to some embodiments of the present disclosure, there is provided a configurable processing-in-memory (PIM) system configured to implement a neural network, the system including: a first at least one PIM subarray configured to perform a filtering operation of an i-th filter of an i-th layer of the neural network (i being an integer greater than zero); a second at least one PIM subarray configured to perform a filtering operation of an (i+1)-th filter of an (i+1)-th layer of the neural network; and a controller configured to control the first and second at least one PIM subarrays, the controller being configured to perform: supplying a first set of i-th values of the i-th layer to the first at least one PIM subarray to generate (i+1)-th values for the (i+1)-th layer; determining a quantity of the (i+1)-th values as being sufficient for processing by the second at least one PIM subarray; and in response to the determining, supplying the (i+1)-th values to the second at least one PIM subarray to generate an output value for a subsequent layer of the neural network while concurrently supplying a second set of i-th values of the i-th layer to the first at least one PIM subarray for processing.

In some embodiments, a PIM subarray of the first and second at least one PIM subarrays includes: a plurality of bitcells for storing a plurality of weights corresponding to a respective one of the i-th or (i+1)-th filters.

In some embodiments, the neural network includes a convolutional neural network, and the i-th filter is a sliding convolutional filter.

BRIEF DESCRIPTION OF THE DRAWINGS

The accompanying drawings, together with the specification, illustrate example embodiments of the present disclosure, and, together with the description, serve to explain the principles of the present disclosure.

FIGS. 3A-3C illustrate inter-layer pipelining of inference in a neural network, according to some embodiments of the present disclosure.

FIGS. 4A-4C illustrate a combination of inter-layer and intra-layer pipelining of inference in a neural network, according to some embodiments of the present disclosure.

DETAILED DESCRIPTION

The detailed description set forth below is intended as a description of example embodiments of a system and method for pipelined machine learning acceleration, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Aspects of the present disclosure are directed to mapping a machine learning application in a pipelined fashion onto PIM-based accelerators. The pipelining may include inter-layer pipelining, intra-layer pipelining, or a combination of the two types. The PIM-based system is reconfigurable and the pipelining scheme(s) is/are use specific and can be mapped onto the PIM-based system on a case by case basis to increase (e.g., maximize) power-performance for each application. According to some examples, the pipelining scheme(s) of the reconfigurable PIM-based system may provide significant (e.g., orders of magnitude) power-performance improvement over other digital or PIM-based inference accelerators of the related art. Further, the pipelining scheme(s) may provide stall free or low latency operation of network topology on hardware.

Figure 1:
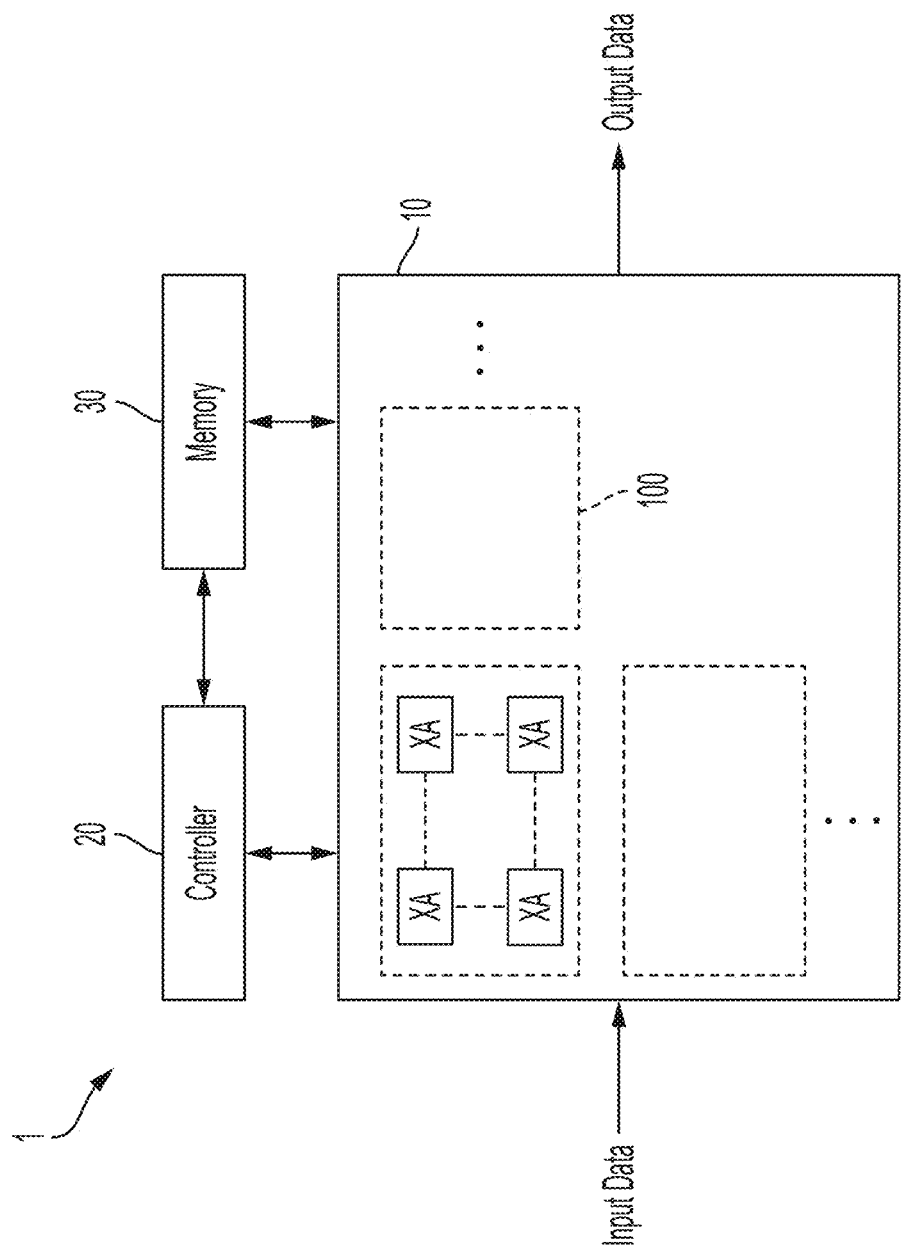
FIG. 1 is a schematic diagram illustrating a configurable PIM system, according to some embodiments of the present disclosure.

FIG. 1 is a schematic diagram illustrating a configurable PIM system 1, according to some embodiments of the present disclosure.

Referring to FIG. 1, the configurable PIM system 1, once trained, performs inference on input data to generate output data, which may be a prediction based on input data. According to some embodiments, the configurable PIM system 1 includes a PIM array 10, which includes a plurality of tiles 100, for performing inference operation, a controller 20 for controlling operations of the PIM array 10, and a memory 30 (e.g., an on-logic-die memory for storing the outputs or intermediate results of each of the tiles 100 of the configurable PIM system 1. In some examples, the memory 30 may be an embedded magneto-resistive random access memory (eMRAM), a static random access memory (SRAM), and/or the like.

Figure 2B:
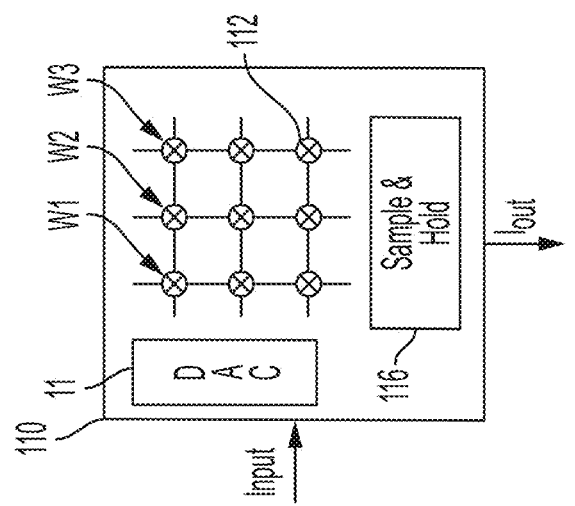
FIG. 2B illustrates a PIM sub-array of the tile according to some embodiments of the present disclosure.
Figure 2A:
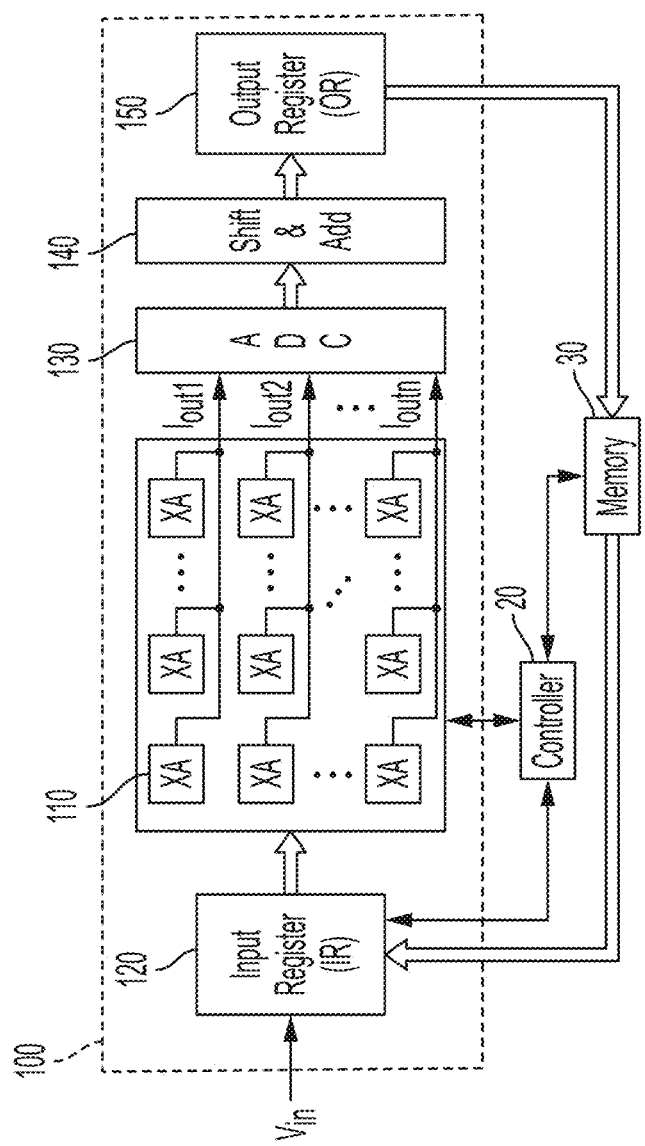
FIG. 2A is a schematic diagram illustrating a tile of the configurable PIM system, according to some embodiments of the present disclosure.

FIG. 2A is a schematic diagram illustrating a tile 100 of the configurable PIM system 1, according to some embodiments of the present disclosure. FIG. 2B illustrates a PIM subarray 110 according to some embodiments of the present disclosure.

Referring to FIG. 2A, according to some embodiments, a tile 100 of the PIM array 10 includes a plurality of PIM subarrays 110, which may be organized in a matrix form; an input register 120 configured to receive and store an input signal Vin (e.g., an input voltage signal, also referred to as input activations), which may correspond to the input data, and may provide the stored input signal to the appropriate one(s) of the PIM subarrays 110; an analog-to-digital converter (ADC) 130 configured to convert the analog output of the PIM subarrays 110 into a digital signal (e.g., a binary signal); a shift and add circuit 140 for storing and adding the output of the ADC 130 in one clock cycle; and an output register 150 for storing the output of the shift and add circuit 140 (referred to as output activations) before sending the output to the memory 30 for storage. In some examples, the controller 20 may control the operation of the input and output registers 120 and 150 and may determine to which PIM subarrays 110 to send the data stored at the input register 120.

Referring to FIG. 2B, in some embodiments, each PIM subarray 110 includes a plurality of bitcells 112, which may be either analog or digital (single or multi-bit). In some examples, the bitcells 112 may be two or three terminal non-volatile synaptic weight bitcells. The bitcell 112 may be a resistive random access memory (RRAM) that can act as either analog or digital memory. However, embodiments of the present disclosure are not limited thereto, and in some examples, the bitcell 112 may be a conductive bridging random access memory (CBRAM), a phase-change memory (PCM), a ferroelectric field-effect transistor (FerroFET), a spin-transfer torque (STT) memory, or the like. The bitcells may also include multiple units of memory cells and have more than three terminals. To select an individual bitcell 112, one or more diodes or field effect transistors (FETs) may be attached in series to the bitcell 122. The PIM subarray 110 further includes peripheral circuitry, such as a digital-to-analog converter (DAC) 114 for converting digital inputs to analog voltage signals to be applied to one or more of the bitcells 112, a sample and hold circuit 116 for storing the output of the bitcells 112 before passing it on to a subsequent block.

In some embodiments, the PIM subarray 110 acts as a filter (e.g., a convolutional filter) with each bitcell 112 storing a learnable weight (w1, w2, w3, etc.) of the filter.

Referring to FIGS. 2A-2B, a machine learning system may be described by a network such as a convolution neural network (CNN), a fully connected (FC) neural network, and/or a recurrent neural network (RNN) that has multiple interconnected layers. These interconnected layers may be described by weight matrices that are mapped and stored in the bitcells 112.

In some embodiments, a set of PIM subarrays 110 are assigned to each layer of the neural network based on the network topology.

The number of rows of PIM subarrays 110 in a tile 100 may be determined by the filter size of an interconnected layer, for example, a layer of a CNN. The number of columns of PIM subarrays 110 in a tile 100 may be determined by the number of filters of that layer, the number of bits mapped per bitcell 112 and the precision of the filter weight. In some embodiments, each row of PIM subarrays 110 represents a filter of a CNN. Input activations from a previous layer may be fed concurrently (e.g., simultaneously), in one clock cycle, as row inputs to rows of PIM subarrays 110. In some examples, the rows and columns of the tile 100 may be interchanged as long as the logic within the controller 20 is changed accordingly.

In some embodiments, the PIM subarray 110 may generate an output current $I_{OUT}$ that is conductance weighted (and may represent a synaptic neuron), and the output currents of the PIM subarrays 110 along a row are summed together (e.g., via a common electrical connection coupled to the outputs of the PIM subarrays 110). Thus, the rows of PIM subarrays 110 may generate summed output currents $I_{OUT1}$ to $I_{OUTr}$. The summed output currents, which may be analog signals, are converted to digital signals (e.g., binary data) by the ADC 130. Each summed output may represent a computed partial sum, which is then shifted and added to the partial sum of the next input activation bit by the shift and add circuit 140. The output register 150 then stores the computed partial sum. Once the controller 20 determines that the final output is generated, it stores the final output (back) in the memory 30, which can then be used as inputs to the next layer. How and when this output data is used for processing in the next layer may determine the pipelining scheme being implemented.

According to some embodiments, the mapping of the network layer onto the PIM subarrays 110 is performed in a pipelined fashion, which can result in stall-free (or low-stall) operation. In some embodiments, rather than wait for a layer of the neural network to complete processing before moving onto the next layer, the controller 20 begins processing a next layer of the neural network once sufficient output from a current layer has been generated. This may be referred to as inter-layer pipelining (also referred to as inter-layer parallelism).

FIGS. 3A-3C illustrate inter-layer pipelining of inference in a neural network, according to some embodiments of the present disclosure.

Referring FIGS. 3A-3C, a set of values of the i-th layer (i being an integer greater than zero) may form a 2-dimensional matrix 300. In some examples, the 2-dimensional matrix 300 may represent an image, and each element 302 of the matrix 300 may represent a pixel value (e.g., color intensity). The 2-dimensional matrix 300 may also represent a feature map, with each element 302 representing an output value of a previous layer (i.e., the (i−1)-th layer). For ease of illustration, the 2-dimensional matrix 300 of FIGS. 3A-3C is a 6×6 matrix; however, as recognized by a person of ordinary skill in the art, embodiments of the present disclosure are not limited thereto and the matrix 300 may have any suitable size, expressed as n×m, where n and m are integers greater than one.

The i-th filter 304 (also referred to as a kernel) may be a sliding convolutional filter that operates on the set of values of the i-th layer to generate the values of the next layer (i.e., the (i+1)-th layer). The filter 304 may be represented by a 2-dimensional matrix of size p×q, where p and q are integers greater than zero and less than or equal to n and m, respectively. For ease of illustration, the i-th filter 304 is shown as a 2×2 filter. Each element of the convolutional filter may be a learnable weight value.

The i-th filter 304 shifts/slides/moves across the set of values of the i-th layer by a stride length until the entire set of values of the i-th layer are traversed. At each shift, the i-th filter 304 performs a matrix multiplication operation between the filter 304 and the portion of the matrix of values of the i-th layer over which the filter 304 is operating at that point. The example of FIGS. 3A-3C illustrate a stride length of 1, however, the stride may be 2, 3, or any suitable value. The output of the convolution operation, which forms the set of values of the next layer (i.e., layer i+1) may be referred to as a convoluted feature output. These outputs may populate a matrix 310 associated with the (i+1)-th layer.

In the related art, a layer of the neural network may need to be processed completely before processing values of the subsequent layer, which can be slow.

However, according to some embodiments, the controller 20 monitors the output values generated by the i-th filter 304, and once it determines that there are sufficient quantity of values available to process at the next layer (i.e., the (i+1)-th layer), the controller 20 processes the available output values at the (i+1)-th layer via the (i+1)-th filter 314. Thus, the controller 20 may apply the (i+1)-th filter 314 to available values of the (i+1)-th layer while concurrently (e.g., simultaneously) applying the i-th filter 304 to value of the i-th layer. Such inter-layer pipelining may be performed for any number of, or all of, the layers of a neural network. In other words, convolutional operations may be performed concurrently (e.g., simultaneously performed in two or more layers of the neural network). This may result in a significant improvement in inference speeds of the neural network.

According to some embodiments, a first at least one PIM subarray 110 is configured to perform the filtering operation of the i-th filter 304, and a second at least one PIM subarray 110 is configured to perform the filtering operation of the (i+1)-th filter 314. The controller 20 may supply a first set of i-th values of the i-th layer to the first at least one PIM subarray 110 to generate (i+1)-th values for the (i+1)-th layer, and when it determines that the quantity of (i+1)-th values are sufficient for processing by the second at least one PIM subarray 110, may supply the (i+1)-th values to the second at least one PIM subarray 110 to generate an output value for a subsequent layer of the neural network while concurrently supplying a second set of i-th values of the i-th layer to the first at least one PIM subarray 110 for processing. In some examples, the quantity of available values for a filtering operation is sufficient when the corresponding layer has data for each unit being operated on by the corresponding filter.

In some embodiments, the time (e.g., clock cycle) at which a next layer (i.e., the (i+1)-th layer) can start processing depends on the size of the i-th filter associated with the i-th layer, the size of the (i+1)-th filter associated with the (i+1)-th layer, a stride of the (i+1)-th filter, and the size of the image or feature map corresponding to the values of the i-th layer. In the example of FIGS. 3A-3C, in which each of the i-th and (i+1)-th filters 304 and 314 has a size of 2×2, the i-th filter 304 has a stride of one, the and a stride of 1, the (i+1)-th filter 314 has a stride of 2, the controller 20 begins to process the (i+1)-th layer 7 cycles after initiating the processing of i-th layer. As shown in FIG. 3C, there are insufficient values available in the feature map of 310 for the (i+1)-th filter 314 to perform a further operation. According to some embodiments, each convolutional operation may be performed in one clock cycle.

The processing speed gain from inter-layer pipelining may be further improved by additionally employing intra-layer pipelining (also referred to as intra-layer parallelism) to generate more than one output value from a layer per cycle, according to some embodiments of the present disclosure.

FIGS. 4A-4C illustrate a combination of inter-layer and intra-layer pipelining of inference in a neural network, according to some embodiments of the present disclosure.

Referring FIGS. 4A-4C, according to some embodiments, at each layer of the neural network more than one filter operate concurrently (e.g., simultaneously) to generate more than one output value at a time.

In some embodiments, at any given time, the controller 20 applies a first i-th filter (e.g., a first sliding i-th filter) 304 associated with the i-th layer to a first part/block of the values of the i-th layer to generate a first output value (e.g., a first one of the (i+1)-th values) for the (i+1)-th layer, and concurrently (e.g., simultaneously), applies a second i-th filter (e.g., a second sliding i-th filter) 305 associated with the i-th layer to a second part/block of the values of the i-th layer to generate a second output value (e.g., a second one of the (i+1)-th values) for the (i+1)-th layer.

According to some embodiments, the first and second i-th filters are the same (e.g., contain the same weight map/weight values) but are offset in position by the stride length of the first filter 304. Thus, in effect, the second i-th filter 305 performs the same operation that the first i-th filter 304 would have performed at the next clock cycle, but does so in the same clock cycle as the first i-th filter 304. As a result, in one clock cycle, the PIM array 10 can generate two (or more) values for the next layer. Here, each layer can be subdivided and mapped onto different tiles with one or more copies of the same weight matrix. For example, the first i-th filter 304 may be implemented with one tile 100 and the second i-th filter 305 may be implemented with a different tile 100, whereby the weight matrices for the two tiles 100 are the same.

In some embodiments, the number of parallel operations performed by filters at each layer may be equal to the number of filters forming a combined/composite filter (e.g., 303) at that layer. Here, the stride of the composite filter may be equal to the number of filters forming the composite filter (and performing parallel operations) multiplied by the stride of the constituent filters. For instance, in the example of FIGS. 4A-4C, the stride of the composite filter 303, which encompasses the two i-th filters 304 and 305, each having a stride of 1, is equal to two. As recognized by a person of ordinary skill in the art, embodiments of the present invention are not limited to two parallel operations per layer, and may be expanded to include any suitable number of parallel operations.

As illustrated in FIGS. 4A-4C, with both inter-layer and intra-layer pipelining (the combination of which may be referred to as "ultra pipelining"), the controller 20 may begin processing the (i+1)-th filter after only four clock cycles, and can continue to process the (i+1)-th layer at the next clock cycle (t=5) without any delay. This marks an improvement when comparing with the inter-layer pipelining scheme of the example of FIGS. 3A-3C, where the controller 20 could only begin processing the (i+1)-th filter after 7 clock cycles, and could not perform the next filtering operation of the (i+1)-th filter at the next clock cycle (t=8) due to insufficient quantity of values being available at the (i+1)-th layer.

While the above has described intra-layer pipelining/parallelism with respect to the i-th layer, according to some embodiments, the PIM array 10 may utilize intra-layer pipelining/parallelism in more than one layer (e.g., in all layers) of the neural network.

In addition to the use of using inter-layer and intra-layer pipelining to improve (e.g., increase) processing speeds of a single image or feature map, embodiments of the present disclosure utilize batch pipelining to improve the processing speed of consecutive images/feature maps.

Figure 5:
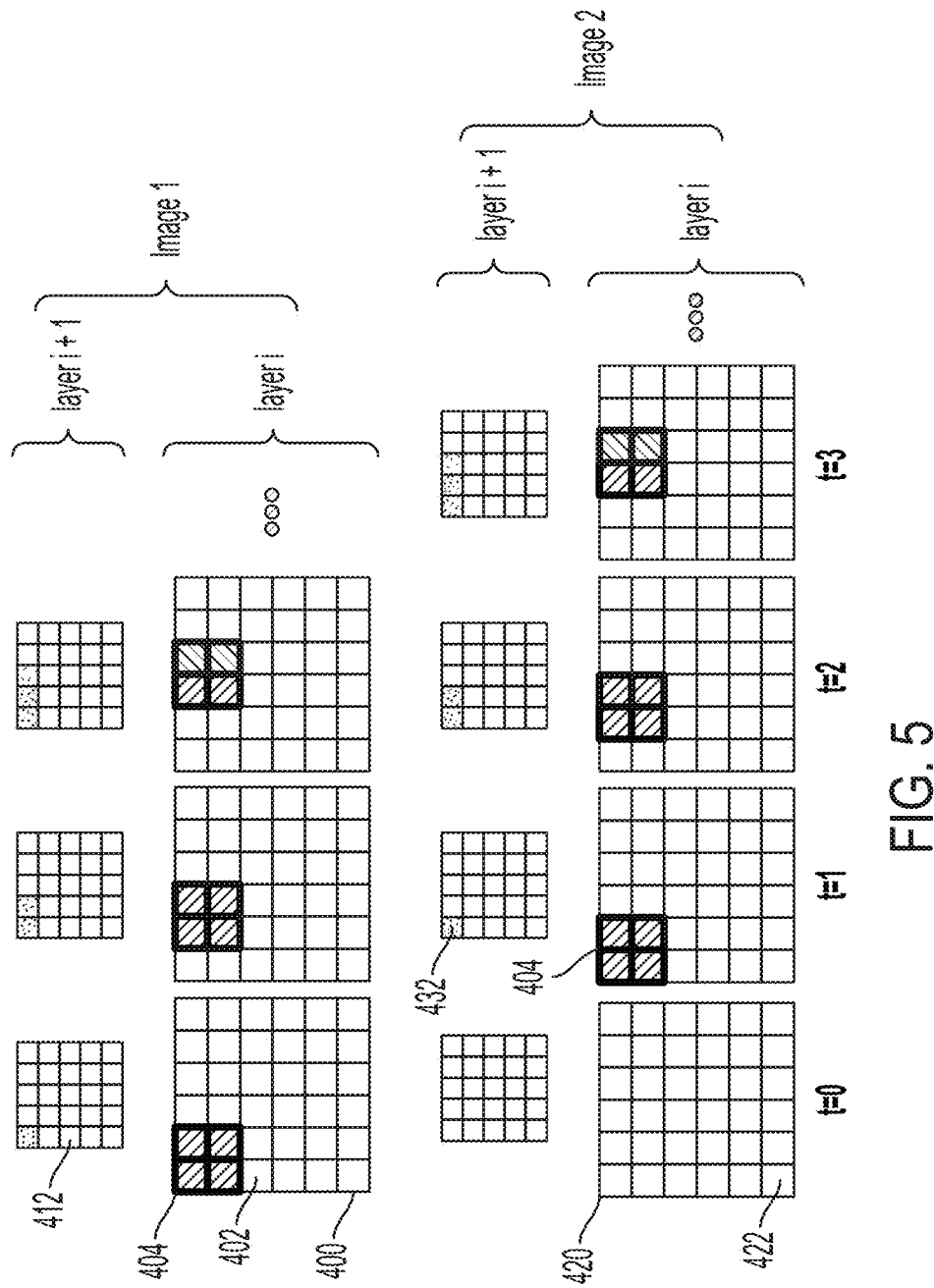
FIG. 5 illustrates batch pipelining of inference in a neural network, according to some embodiments of the present disclosure.

FIG. 5 illustrates batch pipelining of inference in a neural network, according to some embodiments of the present disclosure.

In the related art, each input image/feature map may be processed one by one. As a result, when a first filter associated with a first layer completes processing the first layer, it may remain idle and not process any further information until all other layers of the neural network have completed processing.

According to some embodiments, the PIM array 10 utilizes batch processing to process more than one input image/feature map in parallel (e.g., concurrently/simultaneously). In so doing, when a filter associated with a layer completes processing an image/feature map for that layer, the filter may proceed to process the same layer of a subsequent image/feature.

According to some embodiments, a neural network for batch processing a plurality of images includes a plurality of layers that are mapped onto different tiles 100 of a PIM array 10. The plurality of layers may include an i-th layer (i being an integer greater than zero) and an (i+1)-th layer. The configurable PIM system 1 processes, for a first input image, first i-th values 402 of the i-th layer to generate first (i+1)-th values 412, which serve as input for the (i+1)-th layer. The configurable PIM system 1 then processes, for the first input image, the first (i+1)-th values 412 of the (i+1)-th layer to generate output values for a subsequent layer. According to some embodiments, while (e.g., concurrent with) processing the (i+1)-th values for the first image, configurable PIM system 1 processes, for a second input image, second i-th values 422 of the i-th layer to generate second (i+1)-th values 432. In some embodiments, the processing of the second i-th values 422 for the second image may be performed concurrently with the processing of the first i-th values 402 for the first input image. The processing of the first i-th values 402 for the first input image may include applying an i-th filter 404 associated with the i-th layer to the first i-th values 402 of the i-th layer to generate the (i+1)-th values for the (i+1)-th layer. Further, processing the second i-th values for the second input image may include applying the i-th filter 404 associated with the i-th layer to the second i-th values to generate the second (i+1)-th values for the (i+1)-th layer. In other words, the same i-th filter 404 may be utilized to process the first and second i-th values in a time-staggered manner. However, embodiments of the present disclosure are not limited thereto, and in some examples, a filter similar to the i-th filter 404, but one which has the same size and stride as the i-th filter 404, may be utilized to process the second i-th values.

According to some embodiments, a first at least one PIM subarray 110 is configured to perform the filtering operation of the i-th filter 404, and a second at least one PIM subarray 110 is configured to perform the filtering operation of an (i+1)-th filter of the (i+1)-th layer of the neural network. The controller 20 may supply first i-th values of the i-th layer to the first at least one PIM subarray 110 to generate the first (i+1)-th values for the (i+1)-th layer, where the first i-th values correspond to a first input image. The controller 20 may also supply the first (i+1)-th values of the (i+1)-th layer to the second at least one PIM subarray 110 to generate output values associated with the first input image. Concurrently with supplying the (i+1)-th values corresponding to the first image, the controller 20 may supply the second i-th values of the i-th layer to the first at least one PIM subarray 110 to generate second (i+1)-th values, where the second i-th values correspond to the second input image.

As illustrated in FIG. 5, the first i-th values 402 corresponding to the first image may form a 2-dimensional matrix 400, and the second i-th values 422 corresponding to the second image may form a 2-dimensional matrix 420. In some examples, the first i-th values 402 include pixel values of the first image (or a rectangular block of the first image), and the second i-th values 422 include pixel values of the second image (or a rectangular block of the second image). The first and second images may have the same size/dimensions. In some examples, the first i-th values 402 include values of a first feature map generated by a previous layer of the neural network, and the second i-th values 422 include values of a second feature map generated by the previous layer of the neural network. The first and second feature maps respectively correspond to (e.g., are generated from) the first and second images. The i-th filter 404 may be a sliding convolutional filter in a form of a p×q matrix, where p and q are integers greater than zero (in FIG. 5, the i-th filter 404 is illustrated as a 2×2 matrix, for ease of illustration).

According to some embodiments, the processing of the second i-th values for the second input image is initiated a time offset after initiation of the processing of the first i-th values for the first input image. The time offset may be greater than or equal to a number of clock cycles corresponding to a single stride of the i-th filter. For instance, in the example of FIG. 5, where the stride of the filter 404 is one, which corresponds to a single clock cycle, the time offset between the processing of the same layer for the first and second images may be at least one clock cycle.

According to some examples, the filters 404 operating on the first and second images may be copies of one another, but implemented in hardware via different PIM subarrays 110.

According to some embodiments, increasing the number of images that are processed in parallel by the configurable PIM system 1 improves processing time (e.g., improves image recognition time). In some embodiments, the number of images that may be batch processed by the configurable PIM system 1 may be limited to the number of clock cycles it takes to fully process a single image. For example, when the processing of a single image takes a 100 clock cycles, a 100 or less images may be batch-processed by the configurable PIM system 1.

According to some embodiments, inter-layer and intra-layer pipelining (which were described with reference to FIGS. 3A-3C and 4A-4C, for example) can be used in tandem with batch pipelining of a plurality of images to achieve even greater performance gain.

The neural network referred to in this disclosure may, according to some examples, be a convolutional neural network (ConvNet/CNN), which can take in an input image/video, assign importance (e.g., via learnable weights and biases) to various aspects/objects in the image/video and be able to differentiate one from the other. However, embodiments of the present disclosure are not limited thereto. For example, the neural network may be a recurrent neural network (RNN), a multilayer perceptron (MLP), or the like.

As described herein, the pipelining scheme(s) of the reconfigurable PIM system according to some embodiments of the present disclosure provide(s) significant (e.g., orders of magnitude) power-performance improvement over other digital or PIM-based inference accelerators of the related art. Further, the pipelining scheme(s) may provide low latency, stall free operation of neural networks on hardware.

As understood by a person of ordinary skill in the art, the operations performed by the controller 20 may be performed by a processor. A memory local to the processor may have instructions that, when executed, cause the processor to perform the controller's operations.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

The configurable PIM system and/or any other relevant devices or components according to embodiments of the present disclosure described herein, such as the controller and processor, may be implemented by utilizing any suitable hardware, firmware (e.g., an application-specific integrated circuit), software, or any suitable combination of software, firmware, and hardware. For example, the various components of the PIM system may be formed on one integrated circuit (IC) chip or on separate IC chips. Further, the various components of the PIM system may be implemented on a flexible printed circuit film, a tape carrier package (TCP), a printed circuit board (PCB), or formed on the same substrate. Further, the various components of the PIM system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A method of pipelining inference of a neural network comprising a plurality of layers comprising an i-th layer (i being an integer greater than zero), an (i+1)-th layer, and an (i+2)-th layer, the method comprising:
processing, by a controller, a first set of i-th values of the i-th layer via an i-th composite filter to generate (i+1)-th values for the (i+1)-th layer;
determining, by the controller, a quantity of the (i+1)-th values as being sufficient for processing by an (i+1)-th filter associated with the (i+1)-th layer, based on generating the (i+1)-th values to correspond to each unit being operated on by the (i+1)-th filter, the i-th composite filter comprising a first i-th filter and a second i-th filter, and generating more than one (i+1)-th value per clock cycle based on the second i-th filter being offset from the first i-th filter on the i-th layer; and
in response to the determining, processing, by the controller, the (i+1)-th values via the (i+1)-th filter to generate an output value for the (i+2)-th layer while concurrently processing a second set of i-th values of the i-th layer via the i-th composite filter.

2. The method of claim 1, wherein the first set of i-th values comprise pixel values of an image.

3. The method of claim 1, wherein the first set of i-th values comprise values of a feature map generated by a previous layer of the neural network.

4. The method of claim 1, wherein the processing of the first set of i-th values of the i-th layer comprises:
applying the i-th composite filter to the first set of i-th values of the i-th layer, such that the first i-th filter is offset from the second i-th filter by a stride length of the first i-th filter.

5. The method of claim 4, wherein the first i-th filter is a sliding convolutional filter in a form of a p×q matrix, where p and q are integers greater than zero.

6. The method of claim 4, wherein applying the i-th composite filter comprises:
performing a matrix multiplication operation between the i-th composite filter and ones of the first set of i-th values overlapping the i-th composite filter.

7. The method of claim 1, wherein the determining the quantity of the (i+1)-th values as being sufficient for processing is based on a clock cycle determined by at least one of a size of the i-th composite filter, a size of an (i+1)-th filter associated with the (i+1)-th layer, a stride of the (i+1)-th filter, and a size of an image or feature map corresponding to the first and second set of i-th values of the i-th layer.

8. The method of claim 1, wherein the processing of the first set of i-th values of the i-th layer comprises:
applying the first i-th filter to a first part of the first set of i-th values to generate a first one of the (i+1)-th values for the (i+1)-th layer; and
concurrently with applying the first i-th filter, applying the second i-th filter associated with the i-th layer to a second part of the first set of i-th values to generate a second one of the (i+1)-th values for the (i+1)-th layer.

9. The method of claim 8, wherein the first and second parts of the first set of i-th values have overlapping values.

10. The method of claim 8, wherein the first and second parts of the first set of i-th values do not have overlapping values.

11. The method of claim 8, wherein the first and second i-th filters are sliding convolutional filters having a same stride and a same dimension.

12. The method of claim 8, wherein the first and second i-th filters comprise the same weight values.

13. A system for pipelining inference of a neural network comprising a plurality of layers comprising an i-th layer (i being an integer greater than zero), an (i+1)-th layer, and an (i+2)-th layer, the system comprising:
a processor; and
a processor memory local to the processor, wherein the processor memory has stored thereon instructions that, when executed by the processor, cause the processor to perform:
processing a first set of i-th values of the i-th layer via an i-th composite filter to generate (i+1)-th values for the (i+1)-th layer;
determining a quantity of the (i+1)-th values as being sufficient for processing by an (i+1)-th filter associated with the (i+1)-th layer, based on generating the (i+1)-th values to correspond to each unit being operated on by the (i+1)-th filter, the i-th composite filter comprising a first i-th filter and a second i-th filter, and generating more than one (i+1)-th value per clock cycle based on the second i-th filter being offset from the first i-th filter on the i-th layer; and
in response to the determining, processing the (i+1)-th values via the (i+1)-th filter to generate an output value for the (i+2)-th layer while concurrently processing a second set of i-th values of the i-th layer via the i-th composite filter.

14. The system of claim 13, wherein the processing of the first set of i-th values of the i-th layer comprises:
applying the i-th composite filter to the first set of i-th values of the i-th layer to generate the (i+1)-th values for the (i+1)-th layer, such that the first i-th filter is offset from the second i-th filter by a stride length of the first i-th filter.

15. The system of claim 13, wherein the determining the quantity of the (i+1)-th values as being sufficient for processing is based on a clock cycle determined by at least one of a size of the i-th composite filter, a size of an (i+1)-th filter associated with the (i+1)-th layer, a stride of the (i+1)-th filter, and a size of an image or feature map corresponding to the first and second set of i-th values of the i-th layer.

16. The system of claim 13, wherein the processing of the first set of i-th values of the i-th layer comprises:
applying the first i-th filter to a first part of the first set of i-th values to generate a first one of the (i+1)-th values for the (i+1)-th layer; and
concurrently with applying the first i-th filter, applying the second i-th filter associated with the i-th layer to a second part of the first set of i-th values to generate a second one of the (i+1)-th values for the (i+1)-th layer.

17. A configurable processing-in-memory (PIM) system configured to implement a neural network, the system comprising:
a first at least one PIM subarray configured to perform a filtering operation of an i-th composite filter of an i-th layer of the neural network (i being an integer greater than zero);
a second at least one PIM subarray configured to perform a filtering operation of an (i+1)-th filter of an (i+1)-th layer of the neural network; and
a controller configured to control the first and second at least one PIM subarrays, the controller being configured to perform:
supplying a first set of i-th values of the i-th layer to the first at least one PIM subarray and processing the first set of i-th values via an i-th composite filter to generate (i+1)-th values for the (i+1)-th layer;
determining a quantity of the (i+1)-th values as being a sufficient quantity for processing by the second at least one PIM subarray, based on generating the (i+1)-th values to correspond to each unit being operated on by the second at least one PIM subarray, the i-th composite filter comprising a first i-th filter and a second i-th filter, and generating more than one (i+1)-th value per clock cycle based on the second i-th filter being offset from the first i-th filter on the i-th layer; and
in response to the determining, supplying the (i+1)-th values to the second at least one PIM subarray to generate an output value for a subsequent layer of the neural network while concurrently supplying a second set of i-th values of the i-th layer to the first at least one PIM subarray for processing.

18. The system of claim 17, wherein a PIM subarray of the first and second at least one PIM subarrays comprises:
a plurality of bitcells for storing a plurality of weights corresponding to a respective one of the i-th composite filter or the (i+1)-th filter.

19. The system of claim 17, wherein the neural network comprises a convolutional neural network, and
wherein the first i-th filter is a sliding convolutional filter.

* * * * *